United States Patent [19]

Blackborow et al.

[11] Patent Number: 5,523,417
[45] Date of Patent: Jun. 4, 1996

[54] RESIN-FREE SUCCINIMIDES

[75] Inventors: John R. Blackborow, Edinburgh, Scotland; Michael J. Clarke, Hull, England

[73] Assignee: BP Chemicals Limited, London, England

[21] Appl. No.: 161,897

[22] Filed: Dec. 3, 1993

[30] Foreign Application Priority Data

Dec. 15, 1992 [GB] United Kingdom ............. 9226108

[51] Int. Cl.⁶ ............................................. C07D 307/60
[52] U.S. Cl. ........................ 549/233; 549/234; 548/520; 548/545; 252/51.5 A
[58] Field of Search .................... 548/520, 545; 252/51.5, 52.5; 549/233, 234

[56] References Cited

U.S. PATENT DOCUMENTS 4,234,435  11/1980  Meinhardt et al. ............ 252/51.5
4,482,464  11/1984  Karol et al. ................... 252/51.5

FOREIGN PATENT DOCUMENTS 587381   3/1994  European Pat. Off. ......... 252/51.5
1483729  8/1977  United Kingdom ............. 252/51.5

*Primary Examiner*—Joseph K. McKane
*Attorney, Agent, or Firm*—Brooks Haidt Haffner & Delahunty

[57] ABSTRACT

This invention relates to novel pure hydrocarbyl succinylating agents, substantially pure derivatives thereof, to a method of preparation of pure substituted succinylating agents and their derivatives, and to the use of thereof as additives for fuels and lubricants. The hydrocarbyl substituted succinylating agents are pure because the real and apparent mole ratios of the succinyl groups to the hydrocarbyl groups in such agents are substantially the same. These are produced by reacting an olefin polymer such as poly(iso)butylene with maleic anhydride to form a hydrocarbyl substitued succinylating agent which is then cleaned by solvent extraction to remove any impurities therein before use in further reactions.

1 Claim, No Drawings

RESIN-FREE SUCCINIMIDES

The present invention relates to novel pure hydrocarbyl substituted succinylating agents and substantially pure derivatives thereof, to a method for the preparation of the hydrocarbyl substituted succinylating agents and the derivatives, and to the use thereof as additives for fuels and lubricants.

Additives are an important means of maintaining engine performance either by cleaning and/or lubricating moving parts of the engine. It is well known in the art to prepare hydrocarbyl substituted succinylating agents (hereafter "HSSA"), and specifically poly(iso)butenyl succinic anhydrides (hereafter "PIBSAs") by the reaction of a poly(iso)butene with maleic anhydride and to convert the PIBSAs to the corresponding succinimides. These succinimides are used as fuel additives in view of their ability to clean and/or maintain in a clean condition carburettors, manifolds, inlet valve ports and the like in an internal combustion engine. However, the PIBSAs and the corresponding succinimides produced by conventional routes, eg by reaction with maleic anhydride and the subsequent reaction of the PIBSA with a polyamine, normally contain undesirable resins which not only show a significant discrepancy between the real and apparent succinylation in the maleinised product (due to the presence of resinified and/or unreacted maleic anhydride) but also adversely affect the detergency properties of such additives. Moreover, the method of manufacturing these additives by the intermediate chlorination route is also undesirable because the presence of any chlorine in the succinimide product may give rise to undesirable products such as dioxin under the conditions prevalent in an internal combustion engine. In addition, the presence of chlorine is, in any case, environmentally undesirable should such products or the packaging containing such products be discharged into the environment accidentally or as waste.

It has now been found that HSSAs which are substantially free of undesirable and resinous products can be produced and the corresponding succinimides produced by the reaction of these HSSAs with a polyamine perform remarkably better as detergents in gasoline and diesel fuels than the imides produced from unpurified HSSAs.

Accordingly, the present invention is a hydrocarbyl substituted succinylating agent in which the real and apparent mole ratios of succinyl groups to hydrocarbyl groups are substantially equivalent and which contains less that 250 ppm of chlorine.

The mole ratios of succinyl groups to hydrocarbyl groups (which is also known as the substitution ratio or the succinylation ratio) can be calculated by measuring the base equivalent (mg KOH/g) of the succinylated product. For the purposes of the present invention, this mole ratio of succinyl groups to the hydrocarbyl groups bound to the succinyl group is calculated from the equation below:

$$\frac{Mn \times \text{base equivalent (mg KOH/g)}}{112200 - (98 \times \text{base equivalent})} \times \frac{100}{\text{conversion}} \quad (1)$$

where the base equivalent is that of the HSSA and the conversion is the percentage conversion of the olefinic hydrocarbon to the corresponding HSSA. If the ratio described in equation (1) above is calculated using the base equivalent of the HSSA, an "apparent" substitution ratio is obtained which does not normally correspond to the "real" mole ratio of succinyl moieties to hydrocarbyl groups bound to the succinyl groups since the HSSA typically contains acidic impurities. The "real" succinylation ratio is calculated using the above equation (1) but substituting the base equivalent of the HSSA after purification eg by washing according to the following procedure.

The HSSA is diluted eg with heptane (HSSA/heptane ca. 30/70 v/v) and this solution is placed in a large separating funnel together with an aqueous solvent, eg an acetone-water mixture (ca. 30/50 v/v), the ratio of the heptane solution to the acetone-water mixture being about 2:1 v/v. The contents of the separating funnel are then shaken thoroughly and then allowed to separate. Two layers are formed of which the lower, aqueous layer is run off and kept. The upper, heptane layer is rewashed with a fresh aliquot of acetone-water mixture and again separated as previously. Thereafter the heptane layer is washed twice more with pure water and then separated. n-Butanol can advantageously be added to break any emulsions formed during the separation. The combined aqueous-acetone layers can be then evaporated to a volume of about 100 ml and then extracted several times with a solvent, eg petroleum ether. The ether-washed aqueous layer can be then finally separated and evaporated to dryness and heated to 170° C. The ether fractions can also be evaporated under vacuum until all the ether solvent has been removed. The residual viscous material can be combined with the original heptane layer and the solvents from this combined ether-heptane fraction removed by evaporation. The residue left behind after this step is heated eg to 180° C. under vacuum. The residual solids from the evaporation of the aqueous layers are analysed to ensure that no hydrocarbyl compounds are present. The base equivalent (mg KOH/g) of the residual solids from the organic ether-heptane layers is then measured and the "real" succinylation ratio is calculated.

A feature of the HSSAs of the present invention is that these apparent and real mole ratios are substantially equivalent. By the expression "substantially equivalent" is meant here and throughout the specification that the discrepancy between the real and apparent mole ratios of succinyl groups to hydrocarbyl groups in the product is less than 0.1 and that the product is substantially free of resins and other undesirable by-products.

The novel HSSA of the present invention is typically a poly(iso)butenyl substituted succinylating agent and is suitably prepared by reacting a poly(iso)butene (hereafter "PIB"), which may be a polymer of n-butene, iso-butene or a copolymer of the two from a mixed feedstock comprising both n- and iso-butenes, with maleic anhydride (hereafter "MA"). This reaction gives rise to a poly(iso)butenyl succinic anhydride (hereafter "PIBSA"). PIBs when used for producing these PIBSAs may be conventional PIBs such as HYVIS® or PIBs which have a high terminal unsaturation, ie PIB chains which terminate in a $=CH_2$ function. Conventional PIBs usually have less than 50% of the chains with terminal unsaturation and most commercial products have less than 20% of chains with terminal unsaturation. The preferred PIBs used for producing the PIBSAs of the present invention have >50% of the chains with terminal unsaturation. The number average molecular weight (hereafter "Mn") of the PIB when used is at least 500, and is preferably >750. A typical example of such a PIB is ULTRAVIS® (ex BP Chemicals Ltd) and a process for producing this polymer is claimed and described in our published EP-A-145235. ULTRAVIS® can be produced in grades which have a terminal unsaturation (ie =CH$_2$ end group) content of over 60% and in Mn ranging from 750–5000. Such PIBs can be produced substantially free of chlorine by the process described in our published EP-A145235.

The PIB is reacted with MA to form the PIBSA as stated above. No chlorination of the PIB is needed to facilitate the reaction with MA. The reaction may be carried out in the presence of a high boiling solvent although a solvent is not essential for the PIB can be reacted with molten MA. For this reaction, it is preferable that the MA and PIB are substantially dry, ie free of water and other impurities, in order to minimise the formation of undesirable by-products.

This reaction is normally carried out in the absence of any catalyst. However, if necessary, a catalyst can be used. Examples of such catalysts include the Lewis acids eg aluminiumtrichloride or alkyl aluminium halides.

The reaction temperature for this maleinisation step is suitably from 100° to 240° C., preferably from 180° to 240° C.

The product from this maleinisation step is a mixture containing the PIBSA, maleic anhydride resins and various side products depending upon the nature of the starting PIB and whether or not the PIB is chlorinated before reaction with MA.

The HSSAs of the present invention can be produced by a number of processes. A mild thermal maleinisation can give the product directly or a conventional thermal maleinisation can be followed by a purification procedure to remove any resins formed during the maleinisation. Such procedures include filtration, washing or solvent precipitation.

A preferred process involves washing with a polar solvent. It is obvious and conventional to clean a succinimide eg by a polar solvent washing in order to render the same free of unwanted impurities before being employed as a detergent or as a dispersant in eg lubricating oil or fuel compositions. However, due to the inherent dispersancy properties of the succinimide, the succinimide has a tendency to form very stable emulsions with polar solvents, especially water, thereby making the cleaning step extremely difficult. The inventive feature is to avoid trying to clean the derivative of HSSA, such as eg the succinimide, but cleaning instead the HSSA used for producing the derivative, such as eg the succinimide prior to the imination reaction. In this way the polar maleic anhydride resins are removed before they are aminated. This step has the added advantage of increased efficiency of removing the maleic anhydride resins before they are aminated in that the maleic anhydride resins are more polar than the corresponding aminated maleic anhydride resins.

The cleaning procedure will be described below using crude PIBSA as a specific example of the impure HSSA. Thus, the crude PIBSA is diluted with a non-polar solvent such as eg an aromatic solvent sold commercially as HAN 8572 (ex Exxon Chemicals) and then cleaned to render it substantially free of resins and other impurities before progressing to the next stage. The effect of dilution is to enable the PIBSA to be entrained along with the hydrocarbon solvent and to facilitate filtering. In this optional step, the diluted crude PIBSA is passed through a filter bed, eg of diatomaceous earth filter cake, where a substantial portion of the resin and other impurities are retained and the bulk of the PIBSA is recovered as the filtrate. The filtrate so derived can be further cleaned by intimate mixing with a solvent which is preferably polar and is substantially immiscible with the hydrocarbon solvent and is capable of removing any remaining resins and other undesirable impurities in the PIBSA. Examples of such polar solvents include oxygenated solvents and water. This second cleaning step can be carried out by treating the crude PIBSA—either as such or after dilution with a hydrocarbon solvent—with a polar solvent. Where a polar solvent is used, a polar solvent phase containing substantially all of the resins and other undersirable materials can be separated from an organic hydrocarbon phase. The organic phase separated contains the cleaned PIBSA and the solvent mixture and is substantially free of any of the undesirable products or resins. The cleaning procedure can be repeated several times in order to ensure that substantially all of the impurities and resins have been removed. The end point in such a cleaning process can be detected by monitoring the acidity of the polar solvent phase until the acidity thereof is substantially constant. Such testing ensures that any acidity values in the purified PIBSA is due to the succinyl groups in the PIBSA and not due to any impurities such as unreacted MA or MA resins or other by-products associated with the PIBSA. The cleaned PIBSA can be recovered from the solvent, if desired, by removal of the hydrocarbon solvent eg by stripping or evaporation. If the PIBSA is to be further reacted with an amine to produce an imide, the organic phase from the cleaning stages can be used as such without removal of the solvent.

Thus, according to a further embodiment, the present invention is a process for the preparation of purified HSSA in which the real and apparent mole ratios of succinyl groups to hydrocarbyl groups are substantially equivalent and which contains less that 250 ppm of chlorine, said process comprising:

a. reacting a poly(iso)butene with maleic anhydride to form a HSSA and
  b. cleaning the HSSA so formed by solvent extraction to obtain the desired product.

When the HSSA is a PIBSA and when so produced is of the desired purity, ie the real and apparent mole ratios of succinyl groups to hydrocarbyl groups wherein are substantially equivalent, it can be reacted with:

a. an amine to form the corresponding succinimide,
  b. an alcohol to form the corresponding ester, or,
  c. with a metal compound such as eg the hydroxide or oxide to form the corresponding salt.

These succinimides, esters and/or salts are then used as additives for fuels or lubricants.

When the PIBSA is reacted especially with a polyamine to produce the corresponding poly(iso)butenyl succinimide, this may be a mono- or bis-succinimide and will hereafter be referred to as "PIBSI". Such PIBSIs are useful as a detergent additive in fuel and lubricating oil formulations.

This reaction between the cleaned PIBSA and the polyamine can be carried out optionally in the presence of a solvent.

The reactant polyamine used for this step is suitably an amine which has at least two basic nitrogen atoms of which at least one is a primary amino group. A polyamine substituted with —OH groups or alkoxy groups or polyoxyalkylene groups can also be used in this step. Specific examples of the polyamines that may be used include ethylene diamine, dimethylamino propylamine, triethylene tetramine, tetraethylene pentamine, N-hydroxyethyl ethylenediamine, polyether amines and the like.

The reaction between the PIBSA and the polyamine is suitably carried out at a temperature in the range from 100° to 200° C., preferably from 50° to 190° C. and a pressure from 1 to 5 bar gauge.

The relative molar ratios of the PIBSA to the polyamine in the reaction mixture is suitably in the range from 2:1 to 1:1. Irrespective of the relative ratios of the two components in this reaction, it must be ensured that the resultant product is substantially free of any unreacted polyamine before being incorporated in a fuel formulation.

According to yet another embodiment, the present invention is a derivative of an HSSA in which the hydrocarbyl substituent group is a poly(iso)butenyl group, which derivative is an imide, an ester or a salt obtainable by a process described below and in which the real and apparent mole ratios of the succinyl groups to the poly(iso)butenyl groups are substantially equivalent and contains less than 250 ppm of chlorine.

According to a further embodiment, the present invention is a process for producing a derivative of cleaned HSSA in which the real and apparent mole ratios of the succinyl groups to poly(iso)butenyl groups are substantially equivalent and contains less than 250 ppm of chlorine, said process comprising:

a. reacting a poly(iso)butene with maleic anhydride to form an HSSA,
b. cleaning the HSSA so formed by solvent extraction to obtain a poly(iso)butenyl succinylating agent in which the real to apparent mole ratios of succinyl groups to poly(iso)butenyl groups is substantially the same and contains less than 250 ppm of chlorine, and
c. reacting the cleaned succinylating agent with a reagent selected from the group consisting of:
   i. a polyamine which has at least two basic nitrogen atoms of which at least one is primary, and optionally carries hydroxy, alkoxy or polyoxyalkylene substituent groups,
   ii. an aliphatic hydroxy compound containing at least one —OH group, and
   iii. a metal hydroxide or a metal oxide, so as to respectively form the corresponding succinimide, succinate ester or succinate salt.

The PIBSI thus produced can be used for blending into lubricating oils, or as gasoline additives optionally in a solvent and/or a carrier which may be a synthetic or a mineral oil. If the polyamine is substituted by alkoxy or polyoxyalkylene groups it may be unnecessary to use a carrier. A particular feature of the PIBSIs produced by the process of the present invention is that they are substantially free of chlorine. This is a particular advantage when such PIBSIs are used as additives for the fuels or lubricants used in internal combustion engines.

Thus, according to a yet further embodiment, the present invention is a lubricating oil or fuel composition comprising a poly(iso)butenyl succinimide in which the real and apparent mole ratios of succinyl groups to poly(iso)butenyl groups are substantially equivalent.

The present invention is further illustrated with reference to the following Examples:

EXAMPLE 1

1.1. Preparation of PIBSA:

A PIB (Mn ca. 950, ULTRAVIS®10, terminal unsaturation approx. 67%, ex BP Chemicals Ltd) was reacted with a 1.99 molar excess of molten MA as follows:

The PIB was heated to 175° C. and pressurised to 15 psig with nitrogen in a reactor. Molten MA was then added to the PIB over a period of about 1 hour. The reactor was then heated to 225° C. during the addition whilst maintaining the reactor pressure for about 2 hours. A crude PIBSA product was formed which was stripped under vacuum for 4 hours to substantially remove excess unreacted MA. The resultant product free of unreacted MA was diluted 80/20 v/v with an aromatic hydrocarbon solvent (HAN 8572, ex Exxon Chemicals) and filtered through a bed of diatomaceous earth to remove insoluble poly-maleic anhydride resins. The resultant filtrate containing PIBSA can be used as such or after the removal of the HAN 8572 solvent for further processing. This is an example of a PIBSA which is oil-free and the final PIBSI formulation produced therefrom will also be oil-free.

The same general procedure was used to produce HYVIS® 10 PIBSA except that the reaction time for HYVIS® 10 PIBSA was four hours as against 2 hours for ULTRAVIS® 10 PIBSA.

In the case where the final PIBSI formulation is an oil-containing formulation, the dilution of the crude PIBSA product, after removal of unreacted MA, is carried out using a mineral oil which is solvent neutral grade 130/150 and this oil remains in the final PIBSI formulation substantially unchanged as does the HAN 8572 when used.

1.2 Preparation of Purified PIBSAs:

Oil-free ULTRAVIS®10 PIBSA (200 g) as produced in Example 1.1 after filtration through a diatomaceous earth filter cake and still containing substantially all of the HAN 8572 solvent was further diluted with 1:1 v/v with a mixture of xylene/butanol (4:6 v/v). Water (400 g) was then added to the above mixture and the mixture was stirred vigorously for 30 minutes. The mixture was transferred to a separating funnel and then allowed to stand to enable separation of aqueous and organic phases to occur. The lower aqueous layer was separated and run off. The washing procedure was repeated using further quantities of water (200 g) until the acidity of the aqueous layer was unaffected by the wash. The organic layer was then distilled under vacuum to a temperature of about 180° C. to remove the organic solvents and any residual water. The resultant purified PIBSA was used in subsequent preparations of the corresponding PIBSI.

EXAMPLE 2

Preparation of Purified ULTRAVIS® 10 PIBSI (Monoimide):

Purified ULTRAVIS® 10 PIBSA (300 g) prepared according to Example 1.2 above was charged to a round-bottomed flask rigged for atmospheric to vacuum distillation and fitted with a stirrer and dropping funnel. The flask was heated to 175° C. and tetraethylene pentamine ("TEPA", 36.0 g) added via the dropping funnel over 15–20 minutes. The flask temperature was held at 175° C. for a further 3 hours and vacuum applied to aid removal of water as it was formed. The product was then allowed to cool and analysed for nitrogen content. The final product had a total nitrogen content of 3.0% w/w, a basic nitrogen content of 1.45% w/w and an alkalinity value of 58.3 mg KOH/g.

EXAMPLE 3

Preparation of Purified ULTRAVIS® 10 PIBSI (Bis succinimide):

Purified ULTRAVIS® 10 PIBSA (300 g) produced according to the process of Example 1.2 was charged to a 1 liter round-bottomed flask rigged for distillation and fitted with a stirrer and dropping funnel. The flask contents were heated to 175° C. and triethylene tetramine ("TETA", 16 g) added dropwise over 15–20 minutes. The flask contents were maintained at 175° C. under partial vacuum for a further 3 hours. Water formed during the reaction was distilled off under vacuum. The resultant PIBSI product had a total nitrogen content of 1.88% w/w and an alkalinity value of 23.8 mg KOH/g.

In a series of Comparative Tests ( "CT", not according to the invention), further samples of PIBSI were prepared which had not been water-washed to remove any residual resinous or other undesirable impurities. These are described below:

CT1: Preparation of unclean ULTRAVIS® 10 PIBSI (Bis succinimide):

ULTRAVIS®10 PIBSA (450 g, PIBSA No. 76 mg KOH/g) prepared as in Example 1.1 above, diluted 80/20 v/v with an aromatic hydrocarbon solvent (HAN 8572, ex Exxon Chemicals) and filtered through a diatomaceous earth filter cake was charged to a 1 liter flask fitted with a stirrer, dropping funnel, Dean and Stark receiver, condenser and nitrogen purge. Triethylene tetramine ("TETA", 22.25 g) was charged to the dropping funnel. The TETA was then added dropwise over 15–20 minutes. The flask temperature was allowed to rise slowly to 175° C. over 3 hours and the liberated water collected in the Dean and Stark trap. This gave a PIBSI with a basic nitrogen content of 0.73% w/w, a total nitrogen content of 1.7% w/w and an alkalinity value of 29.5 mg KOH/g.

In addition to the above, a sample of conventional PIBSI made from HYVIS® 10 polybutene and commercially sold as ADX 201 (mono-imide) by Adibis Ltd UK was also used in the Comparative Tests.

EXAMPLE 4

Engine Test Data:

Samples of the PIBSI prepared according to the Examples and Comparative Tests above were tested to evaluate their peformance by replacing on a weight for weight basis the detergent component of a modern high-performance engine inlet system detergent package. The detergent package used was ADX3866, a commercial package available from BP Chemicals (Additives) Ltd. The results are given in the Tables below:

TABLE 1

| Test No. | Additive Used | Package Treatment level (ppm w/w) | Engine Test | Valve Deposit (mg/valve) |
|---|---|---|---|---|
| A | Base Fuel (8A85) | 0 | Opel Kadett | 397 |
| B | Bis-imide from CT1 | 500 | Opel Kadett | 172 |
| C | Bis-imide from Ex 3 | 500 | Opel Kadett | 75 |
| D | Bisimide C water-washed | 500 | Opel Kadett | 61 |

TABLE 2

| Test No. | Additive Used | Package Treatment level (ppm w/w) | Engine Test | Valve Deposit (mg/valve) |
|---|---|---|---|---|
| E | Base Fuel (83A87) | 0 | M102E | 296 |
| F | ADX201 | 1000 | M102E | 57 |
| G | Product of Example 2 | 1000 | M102E | 10 |

The results in Tables 1 and 2 show that the succinimides of the present invention are significantly superior to those of the prior art and that purifying the final imide again, eg by washing, does not significantly further improve performance.

EXAMPLE 5

Further preparations of cleaned HSSAs derived from HYVIS® and ULTRAVIS®:

Samples of HYVIS® polybutene (200 g) and ULTRAVIS® polybutene (200 g) were separately subjected to a maleinisation reaction using in each case a molar excess of maleic anhydride using reaction conditions shown in Table 3 below. The crude products (PIBSAs) in each case were stripped of excess unreacted maleic anhydride and the stripped product in each case dissolved in heptane (800 ml). Celite filter aid was mixed with each of the heptane solutions of the PIBSAs which were then stirred for several minutes. Each of the mixtures were then separately filtered through a Celite filter cake. The resultant filtrates containing the respective PIBSA in heptane were wahed twice with a water/acetone mixture (60/40 v/v, 300 ml) and after each washing the mixed solutions were allowed to separate into an organic phase and an aqueous phase. In each case, the aqueous layer was discarded and the organic phase recovered after the second washing was stripped of the solvent. The resultant solvent-free product was heated in each case to 180° C. in a rotary evaporator under a strong vacuum for one hour to form a cleaned PIBSA of the present invention. The procedure was repeated to produce a further aliquot each of the cleaned PIBSAs from HYVIS® and ULTRAVIS® so as to obtain a combined weight of PIBSAs in each case of about 500 g. The analysis of the product obtained is shown below in Table 3:

TABLE 3

| PIB | Mn | MA added mol/mol PIB | Reaction Cond Hr | Reaction Cond °C. | PIBSA Conv. % | PIBSA* Acidity mgKOH/g | Succinylation Ratio of purified PIBSA** |
|---|---|---|---|---|---|---|---|
| HYVIS ® | 923 | 3 | 4 | 235 | 70.41 | 78.23 | 0.98 |
| ULTRAVIS | 994 | 3 | 4 | 235 | 88.7 | 90.0 | 0.98 |

*PN (PIBSA No.)
**This was found to be unchanged by further washing

EXAMPLE 6

Preparation of Succinimides:

The washed HYVIS® PIBSA (285.5 g) from Example 5 above was reacted with TETA (14.83 g) for 3 hours at 175°–180° C. in a stirred reactor provided with a nitrogen sparge. The by-product water from the reaction mixture was removed by the nitrogen sparge.

Similarly, the washed ULTRAVIS® PIBSA from Example 5 was reacted with TETA for 3 hours at 175°–180° C. and the by-product was removed, as previously, with a nitrogen sparge.

The products from both these reactions were bis-succinimides which were used as detergents in a commercial formulation ADX3866 (ex Adibis Ltd) used for engine testing. The treatment levels used and results achieved are tabulated in Table 4 below.

CT2—Preparation of succinimides (not according to the invention):

A further set of PIBSAs were made from HYVIS® and ULTRAVIS® following the process described in Example 5 above but the products from the initial reaction of polybutene with maleic anhydride were not diluted in heptane and were not washed. Each product was separately stripped of excess maleic anhydride and filtered at 100° C. through a pre-prepared Celite filter cake. The acidities (PIBSA No. mg KOH/g) of the filtered PIBSAs were measured in each case and they were then reacted separately with an appropriate quantity of TETA [Wt of TETA added=(wt of PIBSA× PIBSA No.×146×0.5)/112200] to make the corresponding bis-succinimide. The reaction in each case was carried out as previously at 175°–180° C. for 3 hours, and by-product water was removed by a nitrogen sparge. The resultant bis-succinimides were used as detergent in a commercial formulation ADX3866 (ex Adibis Ltd) used for engine testing as previously. The treatment levels used and the results achieved are tabulated in Table 4 below:

EXAMPLE 7

A PIBSA in which the real and apparent mole ratios of the poly(iso)butenyl groups to succinyl groups were substantially equivalent was prepared by reacting HYVIS® polybutene (200 g, Mn 2045) with maleic anhydride (28 g) at 235° C. for six hours. The apparent mole ratio of the reaction product after stripping excess maleic anhydride and filtration in mineral oil through a Celite filter bed in mineral oil was 0.95. The real mole ratio after a washing procedure as described in the text above was found to be 0.89.

Thus, the products before washing had substantially the same mole ratio as that of the washed product. This shows that the products of the present invention can be produced by processes which do not involve washing.

We claim:

1. A poly (iso) butenyl succinic anhydride having:

(a) substantially equivalent real and apparent mole ratios of succinyl groups to hydrocarbyl poly(iso)butenyl groups, and

TABLE 4

| Detergent in Formulation | Package Treatment level (ppm) | Engine tested | Valve Deposit (mg/valve) | Valve Rating | Manifold Rating |
|---|---|---|---|---|---|
| Unwashed HYVIS ® bis-succinimide | 500 | Opel Kadett | 106 | 8.99 | 9.44 |
| Washed HYVIS ® bis-succinimide | 500 | Opel Kadett | 49 | 8.8 | 9.94 |
| Unwashed ULTRAVIS ® bissuccinimide | 500 | Opel Kadett | 62 | 9.34 | 8.74 |
| Washed ULTRAVIS ® bissuccinimide | 500 | Opel Kadett | 35 | 9.31 | 9.69 |

The above results show that formulations which use succinimides from purified PIBSAs of the present invention perform significantly better than those of the prior art in respect of valve cleanliness.

(b) a number average molecular weight of from 750 to 5000; and containing less than 250 ppm of chlorine.

* * * * *